March 15, 1949.  C. E. HEMMINGER  2,464,505
METHOD OF PRODUCING GASOLINE
Filed Sept. 18, 1946
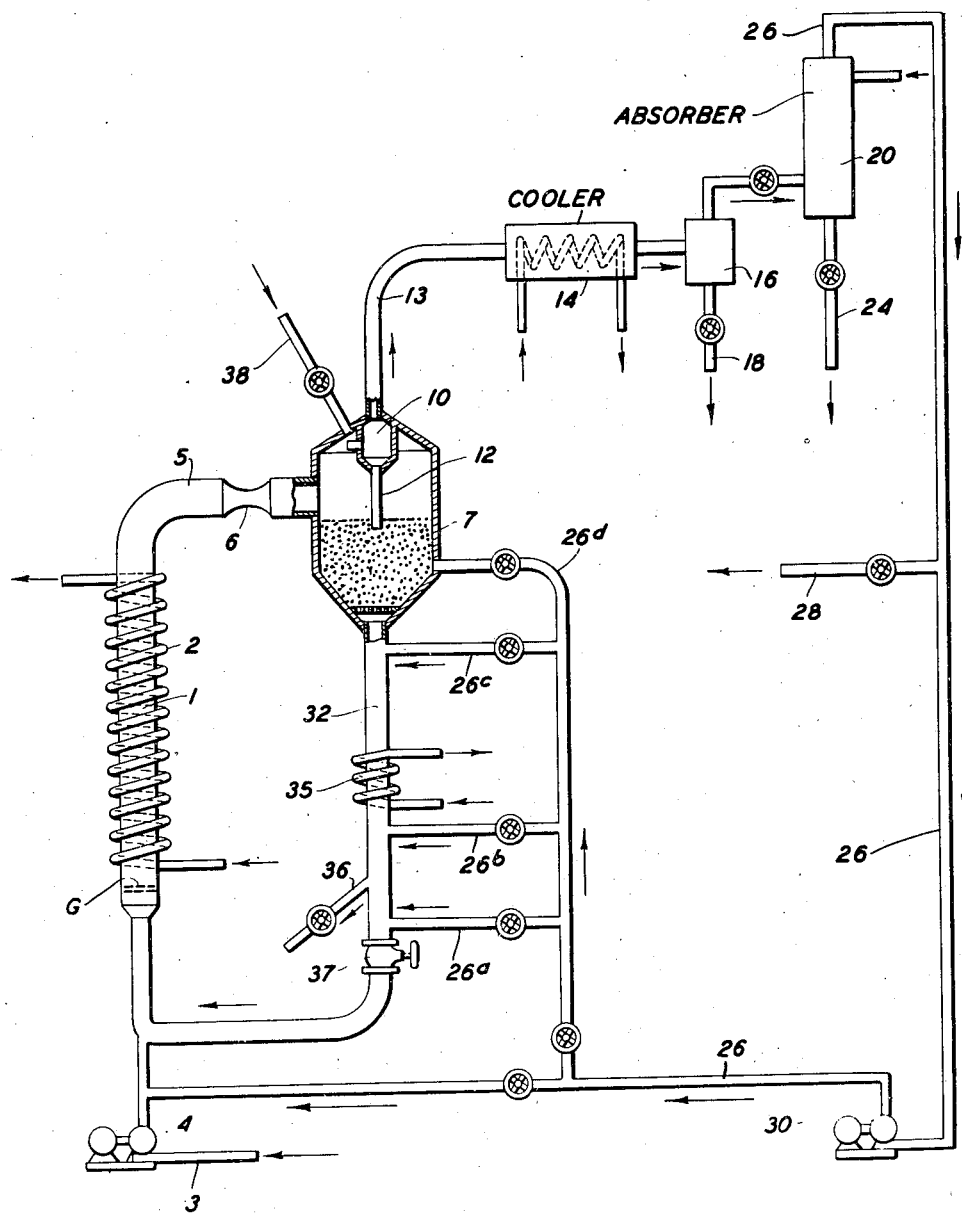
INVENTOR:
CHARLES E. HEMMINGER,
BY J. Cashman
ATTORNEY Patented Mar. 15, 1949

2,464,505

UNITED STATES PATENT OFFICE 2,464,505

METHOD OF PRODUCING GASOLINE

Charles E. Hemminger, Westfield, N. J., assignor to Standard Oil Development Company, a corporation of Delaware Application September 18, 1946, Serial No. 697,808

3 Claims. (Cl. 260—449.6)

1

The present invention relates to improvements in the synthesis of hydrocarbons and oxygenated hydrocarbons from suitable mixtures of carbon monoxide and hydrogen, the synthesis being performed in the presence of a suitable catalyst.

An important object of the present invention is to perform the synthesis of hydrocarbons from carbon monoxide and hydrogen under hereinafter disclosed conditions wherein a maximum quantity of olefinic gasoline is formed.

Another object of my invention is to perform the hydrocarbon synthesis catalytically employing carbon monoxide and hydrogen as reactants under conditions such that minimum quantities of gas and products are retained by the catalyst.

Another important object of my invention is to perform the synthesis of hydrocarbons catalytically employing carbon monoxide and hydrogen as reactants under conditions such that minimum quantities of carbonaceous contaminants are formed on and retained by the catalyst.

Other and further objects will appear from the following more detailed description and claims.

To the accomplishment of the foregoing and related ends, I provide a process in which preferably a powdered iron catalyst is caused to flow concurrently upward at a rather rapid rate in contact with the reactants at elevated temperatures and pressure under conditions such that the reaction time is restricted to prevent polymerization of olefins formed to high molecular weight hydrocarbons boiling above the gasoline boiling range, according to a procedure which will be explained in greater detail hereinafter. Furthermore, in order to mitigate accumulation of waxy material or carbonaceous material on the catalyst, I provide a rather wide temperature gradient through the reaction zone, with the highest temperatures occurring at near the top thereof, and also a rather wide pressure differential across the reaction zone, the greater pressure being, of course, at the bottom and the least pressure at the top and thus succeed in mitigating the deposition of carbonaceous or waxy material on the catalyst.

In the drawing I have shown diagrammatically the essential elements of an apparatus in which a preferred modification of my invention may be carried into effect.

Referring in detail to the drawing, I represents an elongated vertical cylindrical reactor, having a length greatly exceeding its diameter, through which a suspension of powdered iron catalyst is carried by the reactants. The catalyst preferably has a particle size of from 1 to 100 microns, with about 5 to 20 per cent of the same having a particle size of 1 to 20 microns. The superficial velocity of the reactants passing through the reactor is from 2 to 15 ft./sec., with a velocity of 4 to 10 ft./sec. being preferred. The reactants, consisting of carbon monoxide and hydrogen, essentially, and proportioned in the ratio of 1 to 2 volumes of hydrogen per volume of carbon monoxide, flow in the present system through a line 3 carrying a compressor 4. These reactants are mixed with powdered catalyst supplied from a standpipe 32 to form a suspension, which suspension is forced into the reactor carrying a grid or screen G disposed at the bottom thereof and thereafter passes upwardly through the grid and reactor at the velocity stated. Part of the heat of reaction is removed through cooler 2 mounted in or around the reactor by any conventional means. It is spaced along the reactor to give the desired linear temperature distribution along the reactor. The suspension passes through the reactor at elevated temperatures and pressure (which will be disclosed hereinafter) and then is withdrawn through a line 5 passed through constriction 6 and discharged tangentially into a hopper 7 which is of substantially greater internal diameter than reactor 1. The constriction 6 may be a venturi mounted in pipe 5, an orifice or any other mechanical method to cause a pressure drop in line 5 so that the pressure in reactor 1 is appreciably greater than in hopper 7. In this hopper a separation or disengagement of reaction products from catalyst occurs, due to the lowered velocity and change in direction of flow of the gasiform materials, the catalyst settling by gravity into the bottom of the said hopper 7. The gasiform material is separated from the main bulk of the catalyst, then passed through one or more centrifugal separators 10 where entrained fines are removed, and returned to the main bulk of the catalyst by means of dip pipes 12. The gasiform products withdrawn from a hopper 7 through a line 13 pass through a cooler 14 where they are cooled sufficiently to condense water and then the product is discharged into a separator 16 from which liquid material, including water and hydrocarbons, may be withdrawn through line 18, while the uncondensed material is withdrawn into an absorber 20 with absorbent oil introduced into the top of the adsorber through line 22. The lean oil scrubs out a preponderance of the hydrocarbons and the fat oil is withdrawn from the absorber through line 24. The unabsorbed gases, including carbon monoxide, hydrogen, carbon dioxide and $C_1$ to $C_4$ hydrocarbons, are withdrawn through line 26 and may be rejected from the system through line 28 or recycled to feed inlet line 3 for further use in the process, the line 26 carrying a compressor 30.

Referring to the hopper 7, the catalyst collected in the bottom thereof is withdrawn through a standpipe 32 carrying cooling means 35, the latter being any conventional or known means for cooling a solid, including a coil through which a cooling fluid may be circulated in heat exchange relationship with the hot catalyst passing through standpipe 32, or any other means for extracting heat therefrom may be employed. In order to increase the fluidity of the catalyst descending in pipe 32 and to strip the same of adsorbed hydrocarbons, a quantity of the gasiform material in line 26 may be injected via line 26a, 26b, 26c and 26d into a plurality of spaced points in the said standpipe and hopper 7. The standpipe 32 is provided with a flow control valve 37 positioned at near the bottom thereof so as to control the amount of catalyst which is recycled to the reaction zone. The catalyst passes through the valve in measured quantities and then mixes with the said gases to form the suspension hereinbefore mentioned and is returned to the reaction zone for further use in the process.

To regenerate catalyst a portion thereof may be withdrawn through 36 and treated with an oxygen containing gas in a regenerator (not shown) to revivify and perhaps resinter the catalyst for re-use in the present process. Make-up catalyst may be added to hopper 7 via line 38.

In operating the process which I have described thus far, I have found that good results are obtained by operating at the bottom of reactor 1 at a temperature of about 550° F. while at the top of the reactor the temperature may be of the order of 700 to 750° F. due to the exothermic heat of reaction released during the passage of the reactants from the vicinity of G to the top of the reactor. The lower temperature prevailing at the bottom of the reactor, as well as the temperature gradient, is effected by the spacing of the cooling coil 2 as a part of reactor 1, the degree of cooling of the catalyst in the standpipe 32, as previously explained, and the rate of catalyst circulation in the system, comprising the reactor 1, the pipe 5, the hopper 7 and the standpipe 32. Without being limited to the specific temperatures indicated above, or, namely 550° F. at the bottom of the reactor and 700° F. at the top of the reactor, the temperature of the catalyst leaving the cooler 35 should be 400 to 500° F. and the rate of catalyst circulation is 500 to 2000 pounds per 1000 cubic feet of feed gas introduced into the reactor. With respect to the pressure in the reactor, the same is maintained within the range of 100 to 800 pounds per square inch with the higher pressure range, starting at 350 to 450 pounds per square inch, preferred. A preferable design of the reactor is such that the length is in the order of 20 to 75 feet, in which the catalyst suspension is in the order of 10 to 50 pounds per cubic foot in density. The opening in the constriction 6 in pipe 5 is regulated or designed so as to have a pressure drop of from 10 to 50 pounds per square inch from reactor 1 to hopper 7 so as to facilitate the de-adsorption of the hydrocarbons from the catalyst in hopper 7.

As previously indicated, however, an outstanding feature of my invention has to do with the contact time. I operate my process under conditions such that I obtain a maximum quantity of olefinic gasoline and I do this by restricting the time in which the reactants are exposed to the influence of the catalyst at reaction conditions so as to prevent polymerization of said olefins to hydrocarbons boiling above the gasoline boiling range. In other words, I feed the reactants to the reaction zone at a rate of from 1000 to 20,000 volumes of reactants at standard temperature and pressure per volume of reactor per hour. By thus operating, I restrict the contact time of the reactants with the catalyst at reaction conditions to from 1 to 20 seconds with 3 to 10 seconds preferred.

As an illustration of the merit of this invention, the following shows the effect of contact time on carbon formation on catalyst per volume of liquid hydrocarbons formed.

| Contact Time | Lbs. Carbon per 100 Gal. Liquid |
| --- | --- |
| 20 sec | 2.0 |
| 2 sec | 0.3 |

It can be seen from the foregoing pilot plant data that for every 100 gallons of liquid product formed two pounds of carbonaceous material were deposited on the catalyst when the contact time was 20 seconds, that is to say, when the average residence of the reactants in the reaction zone in contact with the catalyst was 20 seconds. But the data show that when this was reduced to 2 seconds, the carbonaceous material deposited per 100 gallons of liquid product formed was only 0.3 pound of carbonaceous material. It cannot be said that there is any lowering in yield from a given quantity of carbon monoxide plus hydrogen fed to the system for these materials if unreacted are recycled to the reaction zone from the product recovery equipment. I deem it one of the most important features of my invention that I am enabled by the means hereinbefore disclosed to reduce the rate of formation of carbonaceous material on the catalyst. In the iron catalyst process the formation of carbonaceous and waxy material on the catalyst is one of the most troublesome features, for these contaminants not only lower the activity of the catalyst but cause physical disintegration, making it virtually impossible to separate the catalyst from the reaction vapors. Thus, my process, which tends to repress the formation of carbonaceous deposits on the catalyst, is important in a process of the kind herein described.

In the preceding disclosure, I have in certain instances given specific details as to the manner in which I prefer to operate the process but it will be understood that numerous modifications falling within the scope of this invention may be made by those who are familiar with this art without departing from the spirit thereof.

Having described the nature and purpose of my invention, what I claim is:

1. The method of synthesizing hydrocarbons which comprises suspending a powdered iron catalyst in a flowing stream of a reaction mixture of hydrogen and carbon monoxide, flowing the suspension through an elongated reaction zone at a velocity such that the flow of catalyst and gases within said reaction zone is substantially concurrent and the residence time of both reaction mixture and catalyst therein is not substantially in excess of twenty seconds, maintaining within said elongated zone a temperature gradient of from about 550° F. at the inlet end to about 700° to 750° at the outlet end, discharging said suspension into a separator, separately recovering reaction medium and catalyst from said separator and resuspending the catalyst in a fresh reaction stream.

2. The method according to claim 1 in which heat is continuously withdrawn from said elongated reaction zone at such a rate along the length thereof as to maintain said temperature gradient.

3. The method according to claim 1 in which said reaction zone is maintained at a pressure of at least about 350 pounds per square inch.

CHARLES E. HEMMINGER.

REFERENCES CITED

The following references are of record in the file of this patent:

UNITED STATES PATENTS

| Number | Name | Date |
|---|---|---|
| 2,360,787 | Murphree et al. | Oct. 17, 1944 |